P. LALLEMENT.

Assignor, by mesne assignments, to H. M. RICHARDSON & G. MCKEE.

Velocipede.

No. 7,972. Reissued Nov. 27, 1877.

Witnesses.

W. J. Pratt.

E. C. Perkins.

Inventor.

Pierre Lallement

Assignor to Henry M. Richardson, and George McKee by Crosby & Gregory, Attys

N. PETERS, Photo-Lithographer, Washington, D. C.

UNITED STATES PATENT OFFICE.

HENRY M. RICHARDSON AND GEORGE McKEE, OF BOSTON, MASSACHUSETTS, ASSIGNEES, BY MESNE ASSIGNMENTS, OF PIERRE LALLEMENT.

IMPROVEMENT IN VELOCIPEDES.

Specification forming part of Letters Patent No. 59,915, dated November 20, 1866; Reissue No. 7,972, dated November 27, 1877; application filed October 26, 1877.

*To all whom it may concern:*

Figure 1:
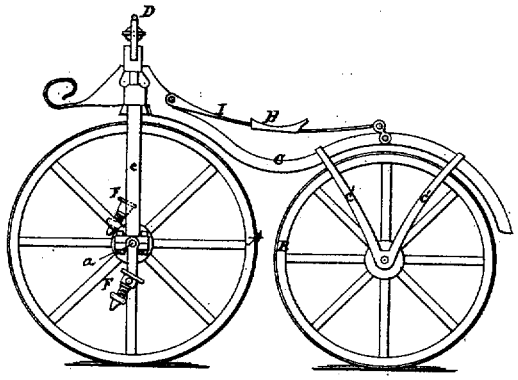
Figure 2:
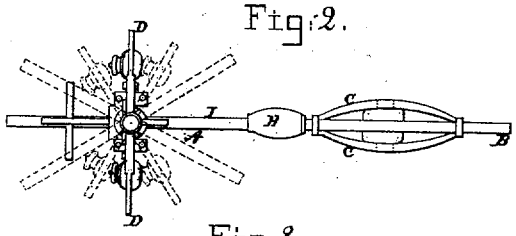
Figure 3:
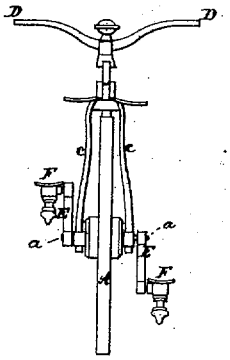

Be it known that PIERRE LALLEMENT, of Paris, France, temporarily residing at New Haven, in the county of New Haven and State of Connecticut, invented certain new and useful Improvements in Velocipedes, of which the following description, taken in connection with the accompanying drawings, is a specification:

Figure 1 represents, in side elevation, a velocipede embodying this invention; Fig. 2, a top view thereof; and Fig. 3, an end view.

This invention, which consists in improvements in driving and guiding mechanism, is shown as embodied in a velocipede having two wheels, one directly in front of the other, the axle of the forward wheel being provided with a crank at each side of the wheel, by which to propel the velocipede, the forward wheel being also so supported as to permit it to be turned to direct the velocipede in the desired path.

A and B are two wheels, of common construction, each upon a separate axle, one wheel being placed directly in front of the other, as shown in Figs. 1 and 2. The bar C, connecting the two axles, has at its rear end arms *e'*, extended down to the axle of wheel B. The two arms *e e*, supporting the axle of the forward wheel A, come together above such wheel, and form a pivoted frame for the forward axle, such frame being so pivoted or connected with the bar C that the arms, and, by them, the axle carrying the wheels, may be turned laterally to the right or left (see dotted lines, Fig. 2) of a direct horizontal line, intersecting the axle of wheel B at right angles with its axis, whereby the position of the forward wheel and the direction of the velocipede may be changed at will.

The axle *a*, to which the forward wheel A is fixed, has, at each side of the wheel, a crank outside the arm supporting it, and on such cranks are placed treadle or foot pieces F, provided each with a flat surface (see Fig. 3) for the foot. This foot-piece is extended below the crank-pin, and balanced so as to retain the flat surface uppermost. One crank extends in the opposite direction from the other. A saddle-seat, H, is arranged, and may be supported by an intermediate spring, I.

It is evident that this two-wheeled velocipede, if left to its natural inclination, would not stand upright; but it may be started and kept upright and in motion, as follows: The rider will hold it upright, stride the saddle, and start the velocipede forward, either by means of his feet in contact with the earth or otherwise. When started, seated on the saddle, he will place his feet, one on each of the treadles, and with each of his hands grasping one of the handles or guiding-arms D, he will tread the treadles alternately, and thus with his feet he will operate the forward axle, and thereby cause the forward wheel to revolve, it being fixed to its axle, and with his hands he will guide the velocipede, and assist to maintain his upright position. If the velocipede is inclined to lean to the right, the rider will turn the wheel to the right, which throws the velocipede to the left; or, if inclined to lean to the left, he will turn the wheel A to the left, as shown in dotted lines, Fig. 2.

A velocipede may be driven with great velocity by means of the cranks attached to the forward wheel. The greater the velocity the more easily the upright position of this two-wheeled velocipede may be maintained. To turn the velocipede to either the right or left, turn the forward-driven guiding-wheel accordingly.

What is claimed is—

1. In a velocipede, a pivoted frame at the forward end of the axle-connecting or seat-supporting bar, a driven wheel and its fixed axle supported therein, said axle being provided with oppositely-projecting cranks adapted to be trod by the feet of the operator to propel the velocipede, substantially as described.

2. In a velocipede having a seat fixed with relation to the axles, the combination, with such a fixed seat, of a forward wheel, its cranked axle and arms to support the forward axle, said arms being pivoted in the fixed seat or bar, to permit it to be changed in position to turn the wheel to the right or left to change the direction of movement of the velocipede, substantially as described.

3. In combination, a fixed saddle-seat, a forward-driven wheel, and its axle, provided with cranks at each side the wheels, arms to support the axle, and handles to turn the arms and wheel to the right or left of a line drawn longitudinally through the fixed saddle-seat, substantially as described.

4. In combination, a forward-driven wheel, an axle provided on each side of such wheel with a crank, and treadles or foot-rests connected with such cranks, and balanced to remain in upright position.

5. In combination, the two wheels A and B, arranged one in front of the other, the cranked axle *a*, the treadles, and the guiding-arms, to operate substantially as and for the purpose described.

HENRY M. RICHARDSON.
GEORGE McKEE.

Witnesses:
G. W. GREGORY,
W. J. PRATT.